UNITED STATES PATENT OFFICE.

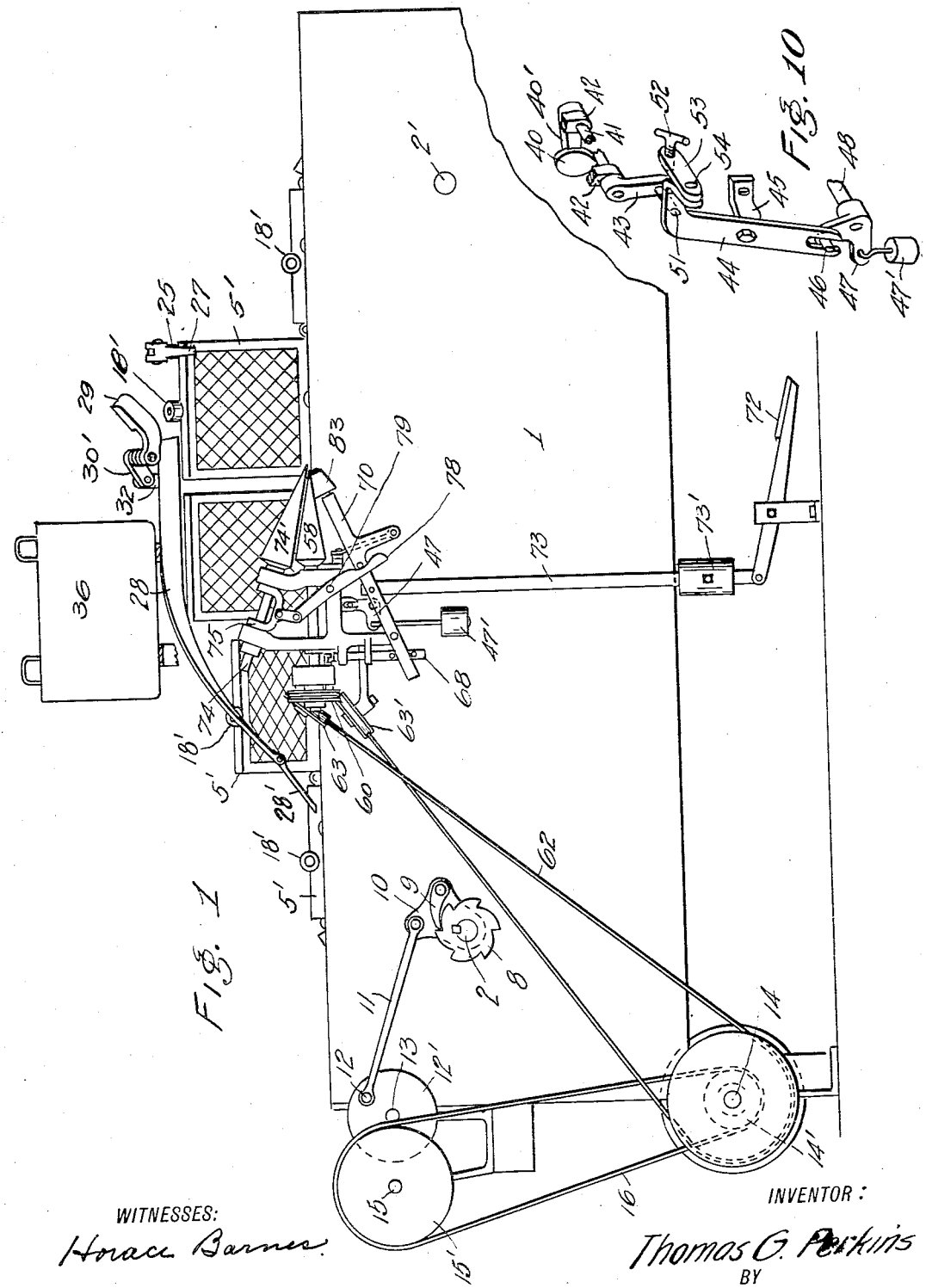

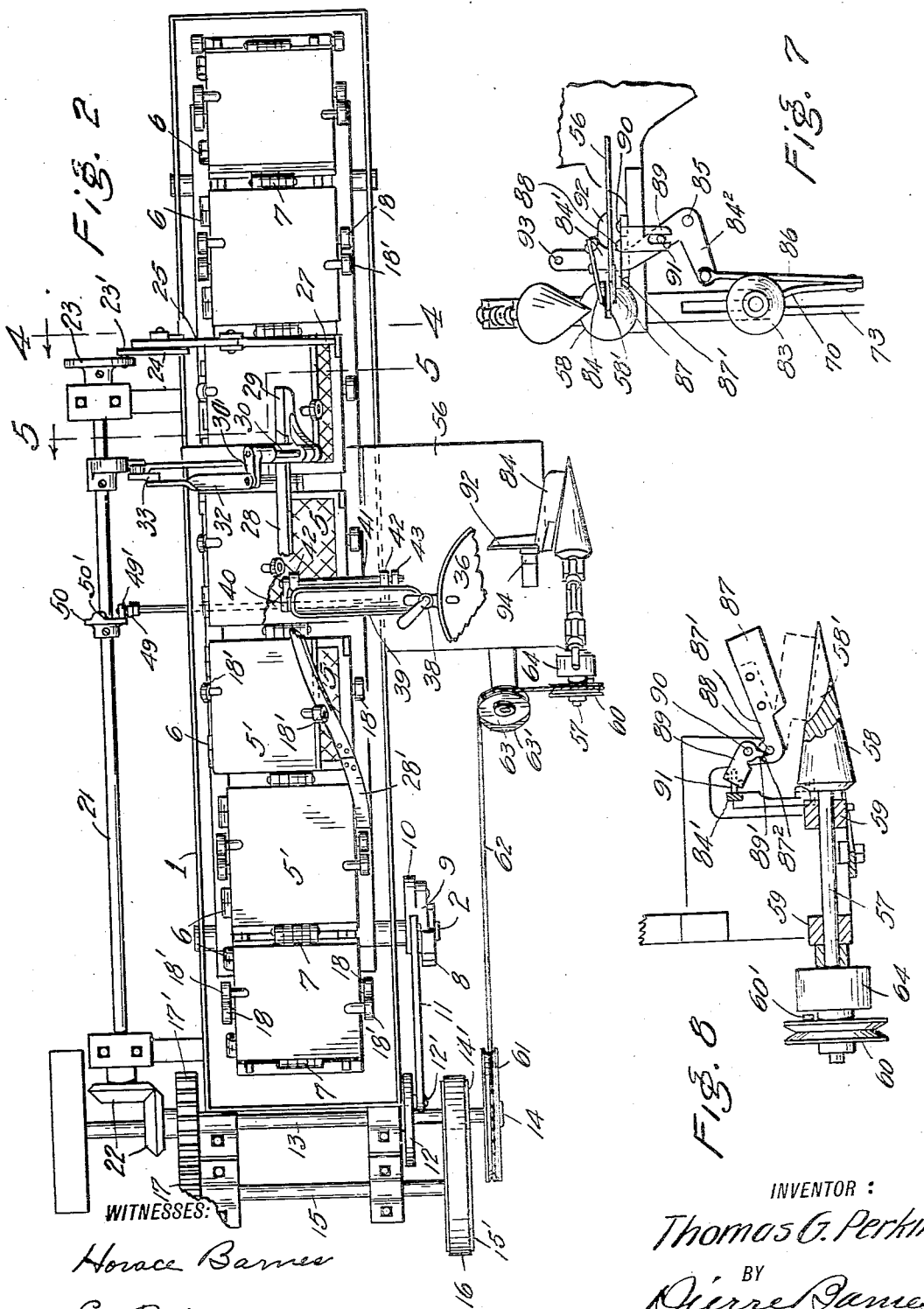

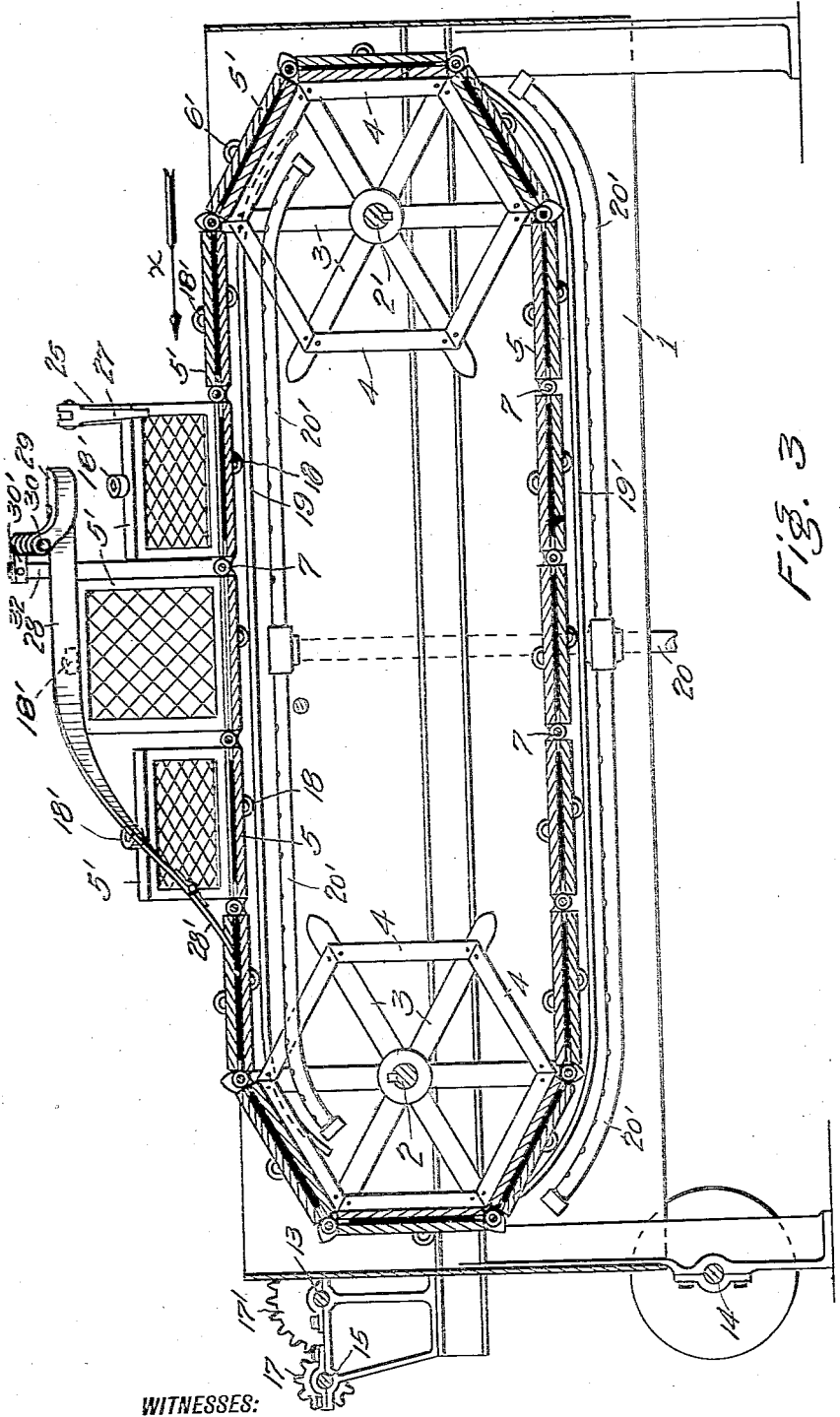

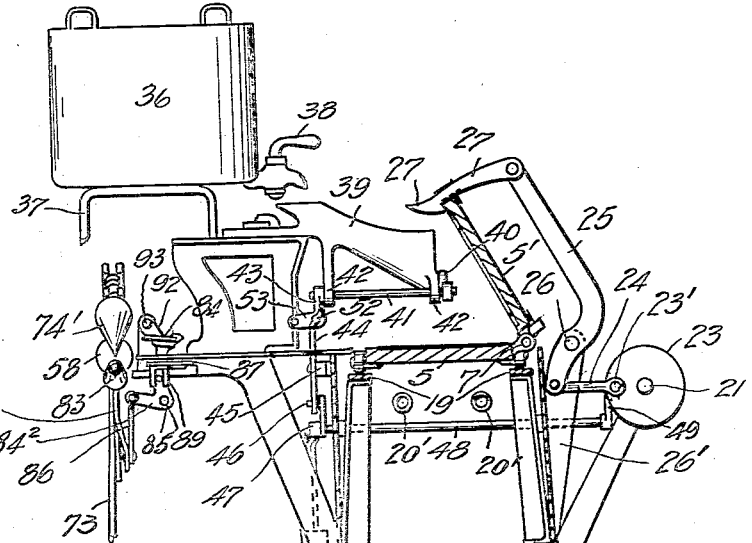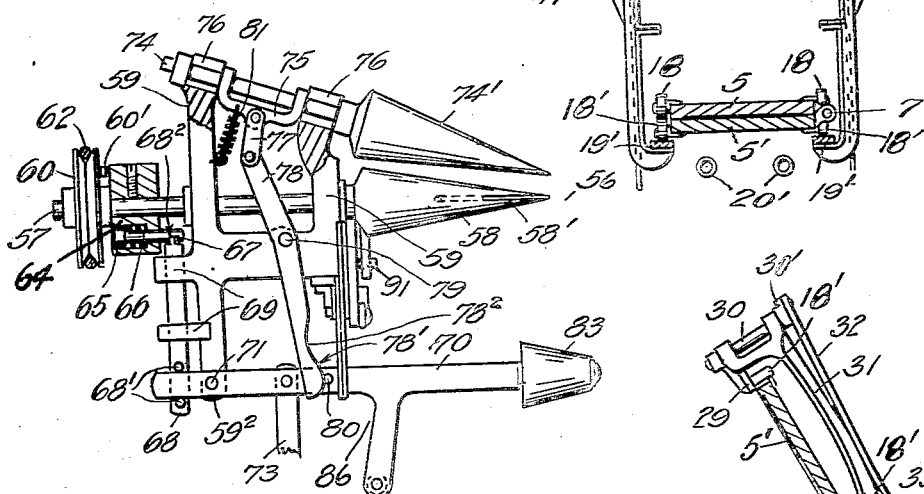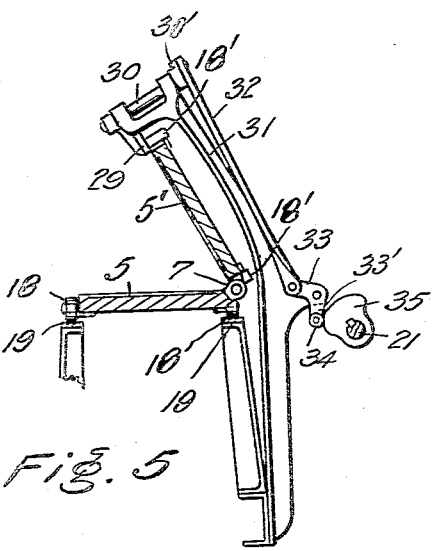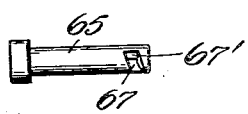

THOMAS G. PERKINS, OF SEATTLE, WASHINGTON.

ICE-CREAM-CONE MACHINE.

1,039,183.   Specification of Letters Patent.   Patented Sept. 24, 1912.

Application filed September 5, 1911. Serial No. 647,541.

*To all whom it may concern:*

Be it known that I, THOMAS G. PERKINS, a citizen of the United States, residing at Seattle, in the county of King and State of Washington, have invented certain new and useful Improvements in Ice-Cream-Cone Machines, of which the following is a specification.

This invention has for its object the improvement in that class of machines wherein ice-cream cones are manufactured by first cooking the material in thin cakes and subsequently rolling the latter about a suitably shaped former, and contemplates a machine requiring but little manual labor and producing cones of a uniform size and thickness, to which ends the invention consists in certain novel features of construction and combination of parts, as will be hereinafter described and claimed.

In said drawings, Figure 1 is a front elevation of an ice-cream cone making machine embodying my invention. Fig. 2 is a plan view thereof with parts broken away. Fig. 3 is a longitudinal vertical section. Figs. 4 and 5 are cross sectional views taken through 4—4 and 5—5 of Fig. 2. Fig. 6 is a detail front elevation showing the cake rolling devices to an enlarged scale. Fig. 7 is an end view of the same and Fig. 8 a plan view. Fig. 9 is a detached elevational view of the pin employed in coupling the power driven cone of the cone-rolling devices with the driving pulley therefor. Fig. 10 is a perspective view of the feed valve and devices for controlling the same.

In these drawings, where similar reference numerals denote corresponding parts throughout, 1 designates a casing which is supported upon a suitable frame. Extending transversely through the casing near its opposite ends are shafts 2 and 2' for sprocket wheels, see Fig. 3, which may each be formed of a pair of spaced spiders constituted of radiating spokes 3 connected near their outer extremities by tie-bars 4. Said sprocket wheels serve as carriers for a chain, so to speak, comprised of batter-cooking irons. These irons are disposed in pairs, 5 and 5', which are respectively connected at the rear by hinges 6; and the adjacent irons 5 are connected from their ends by hinges 7 to accommodate the travel of the chain when passing about the aforesaid sprocket wheels. The lengths of the irons 5 are such that they will fit between the wheel spokes 3 and seat against the tie-bars 4, while the protruding portions of the spokes engage the chain in the interstices between the successive pairs of irons. Intermittent motion is afforded said chain by means of a ratchet wheel 8 mounted on the end of the sprocket wheel shaft 2 being actuated by a pawl 9 carried on an arm 10 loosely mounted on the shaft and which, in turn, derives its motion through the medium of a connecting rod 11 from a crank pin 12 provided on a disk wheel 12' mounted on the end of a transversely arranged shaft 13. The latter, as illustrated in Figs. 1 and 2. is rotated from a power driven shaft 14 and an intermediate shaft 15 by means of a belt 16 passing about pulleys 14' and 15' on the last named shaft, and by spur gears 17 and 17' operatively connecting the intermediate shaft with shaft 13. The cooking irons, 5 and 5', respectively, are provided at the front and rear thereof with wheels 18 and 18' which respectively track on longitudinal rails 19 and 19' disposed at suitable elevations to support the irons horizontally in their travel between said sprocket wheels. The ends of the track rails 19 are curved downwardly, see Fig. 3, in order that the wheels 18 of the irons 5 will be guided onto the straight middle portions of these rails. The other rails, 19', are curved upwardly at their end and are arranged to support the wheels 18' in traveling about the lower peripheries of said sprocket wheels for the purpose of preventing the irons 5' swinging downwardly from the irons 5 about the hinge connections 6. 20 represents a pipe for supplying fuel gas to perforated branch pipes or burner elements 20' provided within the casing and whereby a fire is produced to heat the irons 5 and 5'. Said chain of irons is driven so as to cause the upper horizontal portion, or lead, to traverse the machine in the direction indicated by arrow *x* in Fig. 3. Near the beginning of such traverse movement the then upper irons 5' are tilted upwardly and so maintained to remove a cooked cake from the successively exposed irons 5 and then receive a supply of batter on the same to be cooked during the following cycle of the chain's travel. To attain these ends, there is provided at the rear of the machine a longitudinal shaft 21 which is rotated in unison with the shaft 13 by means of a pair of miter gears 22. On the remote end of shaft 21 from said gears is a disk 23 carrying a crank pin 23' which is connected by a rod 24 (see Fig. 4) with an arm of a lever 25 which is fulcrumed at 26 to a bracket element 26' of the machine frame. Hingedly connected to the other arm of this lever is a hook 27 which is arranged to engage at their front edges irons 5' as the same are successively presented and then individually tilt them upwardly as the hook controlling lever is actuated by the crank pin 23 in each revolution of the same. The above described upward tilting of an iron occurs during an interruption in the travel of the chain of irons.

Devices are provided to relieve the hook 27 of an iron when elevated and retain the iron thus elevated until a cake has been removed from an iron 5 and the latter subsequently supplied with a charge of batter. Accordingly, I employ a short length of elevated track-rail 28 which, at its right hand end and for a distance therefrom, is disposed horizontally at the requisite height and then is inclined downwardly to terminate in proximity to the front track rail 19. The left hand end 28' of the elevated rail is hinged to the main portion to enable such end to be tilted up clear of the traction wheels belonging to the iron 5' to pass unobstructedly thereby when it is desired to allow of the passage of such iron in an unelevated condition as, for example, when the irons are being heated preparatory to the cooking of the batter into cakes in one stage of the machine's operation. Immediately ahead of and normally coextensive with said advance end of the elevated rail is a tongue 29 which is fixedly connected to a shaft 30 journaled in bearings provided in an upstanding element 31 of the machine frame. Said shaft is provided with a crank arm 30' which is connected by a link 32 (Fig. 5) with an arm 33 of a bell crank lever whose other arm 33' carries a roller 34 which engages against the periphery of a cam 35 mounted on the shaft 21. This cam is continuously rotated during the operation of the machine and is adapted to effect the periodic lowering of the tongue 29 from the position in which it is represented in Fig. 1 to that in which it is shown in Figs. 2 and 3 and occurring directly following the bringing of an iron 5' into its uptilted position. The previously raised traction wheel 18' is guided by the tongue onto the elevated rail 28 in the next forward travel of the chain. The cam is constructed to allow the unbalanced weight of the link 32 to effect the upward swinging of the tongue 29 to be clear of a wheel when the iron by which it is carried is being swung upwardly through the agency of the hook 27, as above explained.

The batter-feeding apparatus will now be described.

36 is a batter-containing vessel supported by framework 37 at a suitable height at the front of the machine and is provided with a drain-cock 38 which furnishes a regulated flow of batter into the upper end of an inclined trough 39. The lower end of this trough is located to be approximately above the centers of the irons 5 when the latter are successively stopped. At such lower end of the trough is a batter-discharge opening controlled by a valve 40' (see Figs. 2, 4 and 10) connected to a rod 41 to swing about the axis thereof. The rod 41 is journaled in bearings provided in lugs 42 extending from the trough structure and has an arm 43 which, in effect, coöperates with the arm 40' of the valve to serve as a bell-crank.

44 is a lever fulcrumed to a support 45 secured to or made a part of the machine frame. The lower arm of the lever 44 is provided with a slot to receive an operating pin 46 protruding forwardly from the arm of a bell-crank lever 47 whose other arm suspends a weight 47'. This bell-crank 47 is mounted at the front of the machine on a rockershaft 48 which extends through the machine casing and carries an arm 49 at its rear end, shown in Figs. 2 and 4.

50 is a cam mounted on shaft 21 and, as illustrated, is in the nature of a disk with a protuberance 50' which acts against the arm, or preferably against an anti-friction roller 49' thereon, to swerve the same away from the face of the disk portion of the cam in each rotation of the shaft 21 and in opposition to the referred to weight 47' to effect the rocking motion of the bell-crank lever 47 through the medium of the shaft 48. The upper arm of the lever 44, in the alternate oscillatory strokes thereof, operatively engages the shaft-arm 43 by a stud 51 and a screw 52 carried by the lever arm at opposite sides of the shaft arm. Said screw extends through a threaded hole in an attachment 53 pivotally connected at 54 to the lever arm, as best shown in Fig. 10, so that by swinging the attachment upwardly about the pivot 54, the screw 52 is withdrawn from its operative relation with respect to the arm 43 when the lever 44 would vibrate without affecting the valve 40 which would then remain in closed position. By adjusting the screw 52 to advance its point toward or retract it from the stud 51 the space for the arm 43 of the valve shaft is diminished or increased resulting in more or less motion to the lever 44 independently of the arm affording means for regulating the amount of the valve opening for a desired quantity or feed of the batter.

In the operation of the aforedescribed parts of the invention, it is understood that intermittent motion is given to the series of cooking irons and during the periods of rest, the devices which perform the following functions become operative—namely, the tilting up of one of the irons, the devices for swinging of the track-tongue to and from its operative position and the valve regulation of opening from the batter-trough to supply a charge of batter upon the surface of an iron 5. When an iron 5' is tilted up, the cake thus exposed is removed by the operator and is transferred manually across the top of a table 56 in front of the operator to be automatically rolled into a conical shape by the mechanism which will now be described.

57 is a horizontal shaft extending longitudinally of the machine in front of the table 56 and with its axis at about the level on a cone 58 which serves as the former about which the cakes are successively rolled. Extending into the cone for a distance from the apex is a diametrically arranged slot 58'. The cone-shaft is journaled in bearings provided in spaced standards 59, of the machine frame and upon the opposite end of this shaft from the cone is a loose pulley 60 which is driven at a relatively high speed from a pulley 61 on the shaft 14 by means of a belt 62 which is led by guide pulleys 63 and 63'. In proximity to the pulley 60 is a wheel 64 rigidly secured to the shaft 57, and is provided with means engageable by a stud 60' (Fig. 6) on the wheel whereby the wheel may be united to the rotating pulley for imparting corresponding motion to the shaft 57 and cone 58. Said means advantageously consists of a headed pin 65 which extends through an eccentrically disposed bore in the wheel. 66 is a spring acting between the head of the pin and an annular shoulder provided in said bore to urge the head end of the pin within the orbit of the pulley-stud 60' to transmit the abovementioned rotation of the pulley to the cone. Provided in the periphery of the pin is a helically arranged groove 67, (see Fig. 9) terminating at an end 67' disposed radially with respect to the pin axis.

68 represents a bolt guided for vertical movements in brackets 69 formed on a depending member 59² of the frame. Reciprocatory motion is imparted to said bolt from a lever 70 extending between projections 68' on the bolt and fulcrumed to a pivotal pin 71 on the frame member 59². The upper end of said bolt is formed with a flattened portion 68² which, in the elevation of the bolt enters the pin groove 67 and contacting with the helical walls thereof causes the pin 65 to be shifted in opposition to spring 66 endwise from the stud 60' resulting in the driving devices for the shaft of said cone becoming inoperative. The momentum of the previously driven shaft 57 and the parts associated therewith prolongs the rotary motion of the same until the wheel is arrested by the groove end 67' of pin 65 encountering the bolt. This stoppage occurs when the aforementioned slot 58' of the cone is in the horizontal position in which it is illustrated in Fig. 6. The lever 70 is actuated from a pedal 72, Fig. 1, through the medium of a connecting rod 73.

Having its axis in a vertical plane with the axis of the cone shaft 57 is a superposed shaft 74 journaled in a yoke 75 and movable vertically in guideways 76 provided in the upper ends of the standards 59. At or about its midlength, the yoke 75 is connected by a link 77 with the upper arm 78 of a lever which is fulcrumed intermediate its length by a pivot 79 to the frame, while its other arm extends downwardly to present a cam face 78' for engagement against a pin 80 provided upon the lever 70. To one side of said yoke's connection with the link 77 it is connected by an extensible spring 81 with a standard 59, as shown in Fig. 6, said spring tends to maintain the cam face 78' of the lever against the pin 80 and likewise to tilt the yoke so as to yieldingly hold the cone 74' which is mounted on shaft 74 in the position in which it is seen in Fig. 6.

A conoidal shaped roller 83 is mounted on the end of the lever 70 and is arranged to be swung therewith from the position in which it is illustrated in Fig. 6 to that shown in Fig. 1 and into proximity of and extend a distance in front of the point of the cone 58.

In transporting a cake across the table 56 from the cooking irons to the cone 58, about which circular cakes are successively wound, the edge of a cake is introduced into the cone slot 58' in such a position longitudinally of the cone as to produce ice-cream cones from the cake of uniform configuration and proportioned to afford a maximum strength from the material utilized.

Referring to Figs. 2, 7 and 8, the devices for directing the cakes to the cone slots and locating them consists of guides which, for convenience of explanation, will hereinafter be designated as the upper, lower and edge guides. Said upper guide comprises a plate 84 secured to the arm 84' of a bell crank lever which is pivotally connected at 85 to the machine frame and the other arm 84² is connected by a rod 86 with the lever 70 so that, when the latter is influenced to cause the cone 74' and the conoidal roller 83 to be removed from the cone 58, the guide plate 84 is brought into proximity of the periphery of cone 58 as in Fig. 2. The lower guide consists of a plate 87 secured to an arm 87' which is pivotally connected by pin 88 to the frame to swing horizontally to and from the cone 58. Such swinging motions are attained through the instrumentality of an oscillatory element 89 pivoted intermediate its length to a pin 90 and having at one end a tooth 89' which engages in a notch 87² of the arm 87', while its other end is bifurcated to straddle a pin 91 upon the arm 84' of the bell-crank which carries said upper plate. By thus operatively connecting the upper and lower plates it is evident that they will always be swung in unison. The other, or edge-guide, consists of a vertically disposed plate 92 suspended near its top by a pin 93 from a frame element 94. This plate is brought into operative position (see Fig. 7) by the weight thereof and is swung into inoperative position (see Fig. 4) by being pushed by the upper guide when the same is swung away from the cone 58. The edge guide is desirably of a length so as to extend below the table 56.

The operation of the invention may be explained as follows: The action and functions of the cooking irons 5, 5' and the devices for tilting upwardly the irons 5' as they are successively stopped in their stations beneath the hook 27 will, it is thought, be understood from the foregoing description. As will also be understood the function of the superposed track rail 28 and the operation of the movable end connections 28' and 29 of the same; as well as the batter feeding devices which are illustrated principally in Figs. 4 and 10. The batter is discharged upon each of the irons 5 as they are stopped below the outlet end of the supply trough 39. The batter, as delivered, spreads upon an iron into the form of a circular cake. After a previously uptilted iron 5' has lowered through the office of the inclined portion of the rail 28 upon the batter-charged iron, it is carried in such closed condition through the circuit of its travel until it arrives at the position where the then upper iron 5' is again uplifted through the instrumentality of the hook 27. The irons, meanwhile, have been subjected to the heat generated by the gas from the burners 20' to thoroughly cook the batter. When an iron 5' has been uptilted, as above noted, the operator removes the cake from the complementary iron 5 and transfers it across the table against the guide 92 and between the guide plates 84 and 87 which have been moved into the positions in which they are represented in Fig. 7 through the power exercised by the weight 73' (Fig. 1) subsequent to the withdrawal of foot pressure from the treadle to influence the lever 70 which not only affects the guides but also causes the stoppage of the rotation of cone 58 and the movements of the cone 74' and wheel 83 into the positions whereat they are shown in Figs. 6 and 7. The cake being guided by the above mentioned guides has its advanced edge introduced into the cone slot 58', and into position so that the cake when rolled will protrude beyond the point of the cone 58, whereupon the operator, by pressing the treadle downwardly, overcomes said weight and moves the lever 70 and associated parts from the positions in which they are shown in Fig. 6 to those which they occupy in Fig. 1 to accomplish the operations contributory to the winding of a cake about cone 58, to-wit—the lever 78 is swerved by having the pin 80 brought into recess 78² of the lever and the shaft 74 and cone 74' are moved downwardly by the spring 81, the wheel 83 is moved upwardly directly on lever 70, the bolt 68 retracted from pin 65 so that the spring 66 can effect the endwise movement of the pin to operatively couple the wheel 64 with the driving pulley 60 to turn the cone 58 for winding the cake about the latter. During the winding of the cake the guides are withdrawn, as represented in Fig. 4. In the winding of a cake an edge of the same is retained within the cone slot 58' so that the cake will be drawn about the cone, while the conical wheel 83 serves with the cone 74' to form the protruding portion of the cake into a solid pointed mass to improve the appearance of the product and also render the same nonleakable at the point. After a cake is rolled or wound about the cone 58 the lever 70 is influenced to restore the several elements into the relative positions in which they are shown in Fig. 6 and the previously completed ice cream cone is manually removed from the cone 58.

What I claim as my invention, is—

1. In a machine of the class described, cake rolling means comprising a cone provided with a slot, normally operative driving connections for rotating said cone, a second cone, and a conical wheel normally held in operative relation with the first named cone, manually controlled means whereby the second named cone and said wheel are coincidentally moved into operative positions and likewise affecting the said driving connections to render the same inoperative with respect to the first named cone.

2. In a machine of the class described, a chain comprised of pairs of hingedly connected cooking irons, sprocket wheels therefor, a track-rail intermediate said sprocket wheels, a superposed track-rail, rollers carried by the respective cooking irons and adapted to track on said track-rails and adjustable devices whereby the uppermost elements of said pairs of irons may be selectively caused to be tilted into positions to be supported by said superposed track-rail or rendered inoperative for the purpose of allowing the above mentioned elements to travel unsupported by the superposed track-rail.

3. In a machine of the class described, a shaft, a cake-rolling cone fixedly mounted thereon, a slot in said cone, a second cone, a conical wheel adapted to coöperate with said rolling cone, a driving element loosely mounted on said shaft, clutch devices for engaging said element to said shaft for rotating said rolling cone, and manually controlled means whereby the clutch devices are disengaged and the rotation of the rolling cone arrested to present said slot in a position to receive the edge of a cake, said means likewise serving to regulate the conjoint movements of the second named cone and said wheel.

4. In a machine of the class described, a shaft, a cake-rolling cone fixedly mounted thereon, a slot in said cone, a driving element, clutch devices for engaging said element to said shaft for rotating said rolling cone, the cake guides and manually controlled means whereby the cake guides are rendered operative and the clutch devices are disengaged and the rotation of the rolling cone arrested to present said slot in position to receive the edge of a cake when directed thereto by said guides.

5. In a machine of the class described, the combination with the cake-rolling cone, driving devices for said cone, a clutch included in said devices, guides for directing cakes in being moved to said cone, means controlling the action of the clutch and of said guides whereby the latter are rendered inoperative when the clutch is operative and also to cause the clutch to become inoperative when the guides are operative.

6. In a machine of the class described, a chain comprised of a series of cooking irons hingedly connected from their adjacent edges, a second series of cooking irons hingedly connected to the respective irons of the aforesaid series, sprocket wheels engaging the cooking irons of the first named series, a track rail for supporting said chain in its passage between the sprocket wheels, a track rail positioned at a distance above the aforesaid rail, a movable tongue at the advance end of the higher rail, means for individually and selectively tilting upwardly the successive irons of said second series, means for regulating said tongue whereby the uptilted irons are successively guided onto said higher rail.

7. In a machine of the class described, a chain comprised of a series of cooking irons hingedly connected from their adjacent edges, a second series of cooking irons hingedly connected to the respective irons of the aforesaid series, sprocket wheels engaging the cooking irons of the first named series, a track rail for supporting said chain in its passage between the sprocket wheels, a track rail positioned at a distance above the aforesaid rail, a tongue at the advance end of the higher rail, a hinged member at the other end of the higher rail, means for individually tilting upwardly the successive irons of said second series, means for withdrawing said tongue from the path of an iron when the latter is being raised and subsequently presenting the tongue in position to guide an uplifted iron onto said higher rail.

8. In a machine of the class described, sprocket wheels, means for effecting the rotation of one of said wheels, a chain passing about the sprocket wheels, said chain being comprised of a plurality of pairs of cooking irons whereof one iron of each pair is hingedly connected with the correspondingly disposed irons of the adjacent pairs, track elements for supporting the chain intermediate the sprocket wheels, a track element in superposed relation with respect to the aforesaid track elements, and means whereby one of each pair of irons may be selectively caused to be tilted up into position to be supported by the superposed track element or be caused to travel therebelow and uninfluenced thereby.

THOMAS G. PERKINS.

Witnesses:
PIERRE BARNES,
JAMES A. DUNCAN.